United States Patent Office 2,938,926
Patented May 31, 1960

2,938,926

PREPARATION OF ALKYLDIBORANES

Robert L. Goller, Madison, and Robert R. Walters, Kenosha, Wis., assignors to Callery Chemical Company, Pittsburgh, Pa., a corporation of Pennsylvania No Drawing. Filed June 13, 1956, Ser. No. 591,010

6 Claims. (Cl. 260—606.5)

This invention relates to a new method of preparing alkyldiboranes, $B_2H_{6-x}R_x$, and more particularly to their preparation by the pyrolysis of a trialkylborane, $BR_3$.

The trialkylboranes are well known compounds that can be prepared by a variety of methods. They have, for example, been prepared by the reaction of dialkyl zinc or tetraalkyl lead with boron halides, and by the reaction of Grignard reagent with boron halides or boron halide etherates.

The alkyldiboranes are also compounds well known in the art and are useful in the preparation of various boron-carbon compounds. Alkyldiboranes have previously been prepared from the reaction of diborane and a trialkylborane. Monoethyldiborane, dimethyldiborane, trimethyldiborane and tetramethyldiborane have been prepared by Schlesinger and Walker (J. Am. Chem. Soc. 57, 621–5, 1935) by reacting diborane and trimethylborane in various proportions. Similarly, Schlesinger, Horvitz and Burg (J. Am. Chem. Soc. 58, 407–9, 1936) prepared dipropyldiborane by mixing diborane and tripropylborane.

It is an object of this invention to provide a method of preparing alkyldiboranes that does not require the use of diborane.

It is also an object to prepare alkyldiboranes directly from trialkylboranes.

A more specific object is to provide a method of preparing alkyldiboranes by pyrolyzing trialkylboranes at elevated temperatures.

Other objects of this invention will become apparent from the description and claims as hereinafter related.

This invention is based on the discovery that alkyldiboranes are formed when trialkylboranes are thermally decomposed.

In one experiment trimethylborane, $B(CH_3)_3$, was condensed into a 250 ml. autoclave at −160° C. The autoclave was closed and then warmed to a temperature of 160° C. which was maintained for 1 hour. A pressure of 25 p.s.i.g. was developed during the reaction period. The autoclave was then cooled to room temperature and the gases were transferred to the distillation train of a high vacuum system where various fractions were separated. In the first fraction 74% of the charged trimethylborane was recovered unchanged. The second fraction was a liquid at room temperature and had a vapor pressure of 122 mm. of Hg at 0° C. This product contained boron, hydrogen, and carbon and was shown by vapor pressure measurement and infra-red spectrum analysis to consist substantially of methyl and ethyl diboranes. A 22.5% yield of liquid product was recovered. A trace amount of boron containing by-product solids were present in the autoclave. There were no nocondensible gaseous by-products formed in the reaction.

Similar experiments were performed at 500° C. and about 600° C. A pressure of 158 p.s.i.g. was developed in the 500° reaction and a 21% yield of liquid methyl and ethyl diboranes was recovered. A 25% yield of liquid alkyldiboranes was recovered from the 600° reaction, which was carried out at 158 p.s.i.g. The pressure at which the reaction is carried out can be adjusted by changing the ratio of charged material to the volume of the autoclave. The preparation of the alkyl diboranes is dependent on maintaining the trialkylborane at an elevated temperature. The temperature generally ranges from about 150° to 600° C.

An experiment was performed, in a manner analogous to the above examples, in which the reactants were exposed to a platinum catalyst. The catalyst was prepared by working 5.0 gram of 5% platinum on asbestos into 5.4 g. of shredded stainless steel wool. The autoclave was fitted with a reciprocating vertical agitator. The prepared catalyst was suspended on this agitator. Trimethylborane was charged to the autoclave, and the autoclave was heated to a temperature of 505° C. which was maintained for 2⅔ hours. The products were recovered and separated in the same manner as in the previous examples. The reaction proceeded according to

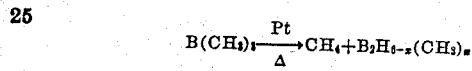

Gaseous methane was produced from the pyrolysis. The first condensible fraction contained 61.3% of the charged trimethylborane. The second fraction was liquid at room temperature, contained boron, carbon, and hydrogen, and was shown by vapor pressure measurements and infrared spectrum analysis to be predominantly methly diboranes.

When triethylborane is pyrolyzed at 300° C. a liquid product is recovered that is substantially a mixture of ethyldiboranes. The volatile by-products formed in the reaction are primarily ethane and ethylene.

The practice of the invention has been illustrated by the use of trimethylborane and triethylborane as examples; it will be realized by those practiced in the art that other lower trialkylboranes such as tripropylborane and tributylborane could be used equally as well.

Although several embodiments of the invention have been described it is to be understood that within the scope of the claims this invention may be practiced otherwise than as specifically described.

Having thus described our invention and the manner in which it is to be performed, what we desire to claim and secure by Letters Patent of the United States is:

1. A method of preparing alkyldiboranes, $B_2H_{6-x}R_x$, where $x$ is an integer from 1 to 4 and R is a lower alkyl radical, that comprises thermally decomposing a trialkylborane of the class $BR_3$, where R is a lower alkyl radical, by heating such a compound at a temperature of at least about 150° C., under superatmospheric pressure, and recovering the alkyldiboranes produced.

2. A method according to claim 1 in which the temperature is between about 150° and 600° C.

3. A method according to claim 2 in which the trialkylborane is trimethylborane.

4. A method according to claim 1 in which the trialkylborane is triethylborane and the product is substantially a mixture of ethyldiboranes.

5. A method of preparing alkyldiboranes, $B_2H_{6-x}R_x$, where $x$ is an integer from 1 to 4 and R is a lower alkyl radical, which comprises thermally decomposing a trialkylborane of the class $BR_3$, where R is a lower alkyl radical, by heating such a compound at a temperature of at least about 150 C. under superatmospheric pressure in the presence of a platinum catalyst and recovering the alkyldiboranes produced.

6. A method according to claim 5 in which the trialkylborane is trimethylborane and the product is substantially a mixture of methyldiboranes.

References Cited in the file of this patent

Stock, "Hydrides of Boron and Silicon," Cornell University Press, Ithaca, New York (1933), pages 100–101.

Gregory: "Uses and Applications of Chemicals and Related Materials," vol. II, Reinhold Publishing Corp., New York (1944), page 353.